(12) United States Patent
Winter

(10) Patent No.: US 7,144,058 B1
(45) Date of Patent: Dec. 5, 2006

(54) LUXURY RECREATIONAL VEHICLE

(75) Inventor: Amos G Winter, Concord, NH (US)

(73) Assignee: Appropriate Combined Technologies, LLC, Santa Clara, CA (US)

( * ) Notice: Subject to any disclaimer, the term of this patent is extended or adjusted under 35 U.S.C. 154(b) by 104 days.

(21) Appl. No.: 10/881,800

(22) Filed: Jun. 30, 2004

Related U.S. Application Data

(60) Provisional application No. 60/483,824, filed on Jun. 30, 2003.

(51) Int. Cl.
*B60P 3/34* (2006.01)

(52) U.S. Cl. ............... 296/26.06; 296/162; 296/26.01; 52/79.5

(58) Field of Classification Search ............. 296/26.01, 296/26.12, 26.15, 162, 26.04, 26.06; 108/44; 52/79.5
See application file for complete search history.

(56) References Cited

U.S. PATENT DOCUMENTS

| | | | |
|---|---|---|---|
| 2,032,630 A | | 3/1936 | Northup |
| 3,961,716 A | | 6/1976 | Renaud |
| 3,984,948 A | * | 10/1976 | Bussard .................... 52/69 |
| 4,268,209 A | | 5/1981 | Westerman |
| 4,854,631 A | | 8/1989 | Laursen |
| 4,918,880 A | * | 4/1990 | Carney ..................... 52/8 |
| 4,966,510 A | | 10/1990 | Johnson, Jr. |
| 5,170,901 A | | 12/1992 | Bersani |
| 5,393,094 A | | 2/1995 | Wardavoir |
| 5,417,468 A | * | 5/1995 | Baumgartner et al. ....... 296/162 |
| 5,653,459 A | * | 8/1997 | Murphy ................... 280/166 |
| 5,899,518 A | * | 5/1999 | Schreiner ................ 296/26.01 |
| 5,997,073 A | * | 12/1999 | Vanderhoof ............... 296/162 |
| 6,015,180 A | | 1/2000 | Beuerle |
| 6,026,923 A | | 2/2000 | Uphaus |
| 6,108,983 A | | 8/2000 | Dewald, Jr. et al. |
| 6,135,532 A | | 10/2000 | Martin |
| 6,325,437 B1 | * | 12/2001 | Hiebert et al. ........... 296/26.01 |
| 6,345,855 B1 | | 2/2002 | Hanser et al. |
| 6,447,048 B1 | | 9/2002 | Crean |
| 6,502,893 B1 | * | 1/2003 | Corliss, Jr. ................ 296/162 |
| 6,598,250 B1 | * | 7/2003 | Pekar ......................... 5/654 |
| 6,712,414 B1 | * | 3/2004 | Morrow .................. 296/26.01 |
| 6,736,446 B1 | * | 5/2004 | Johnson .................... 296/162 |
| 2002/0125736 A1 | * | 9/2002 | Messano .................... 296/165 |
| 2004/0003470 A1 | * | 1/2004 | Frechette ..................... 5/654 |
| 2004/0056510 A1 | * | 3/2004 | Benz et al. ................ 296/162 |

OTHER PUBLICATIONS

"Clearly, we take The Scenic Routes", p. 1.
"We Raised the Standard This High", p. 1.
"SPECS", Sep. 2002, p. 72.
Jones, Lazelle D., "Everything But Room Service: Newell's Mansion On Wheels", FMC, Dec. 2002, pp. 84-88.
PCT International Search Report dated Jan. 27, 2004 of International Application No. PCT/US02/41854 filed Dec. 31, 2002.

* cited by examiner

*Primary Examiner*—Lori L. Coletta
(74) *Attorney, Agent, or Firm*—Maine & Asmus

(57) ABSTRACT

A recreational vehicle is disclosed providing living space extensions with improved actuation and alignment systems, sun deck extensions, a deployable stairway, and a stowable tub. In some embodiments, the living space extension may be actuated by at least one self-centering rack and pinion system. In another embodiment, the alignment system may provide at least one tension cord for maintaining the extension in an upright position. The sun deck extension may be provided with actuatable sidewall panels configured to provide a parapet on at least a portion of the extension. The stairs may be provided with sliding treads coupled to a stringer, and the tub may be retractable and configured with a retractable bed and cover.

8 Claims, 15 Drawing Sheets

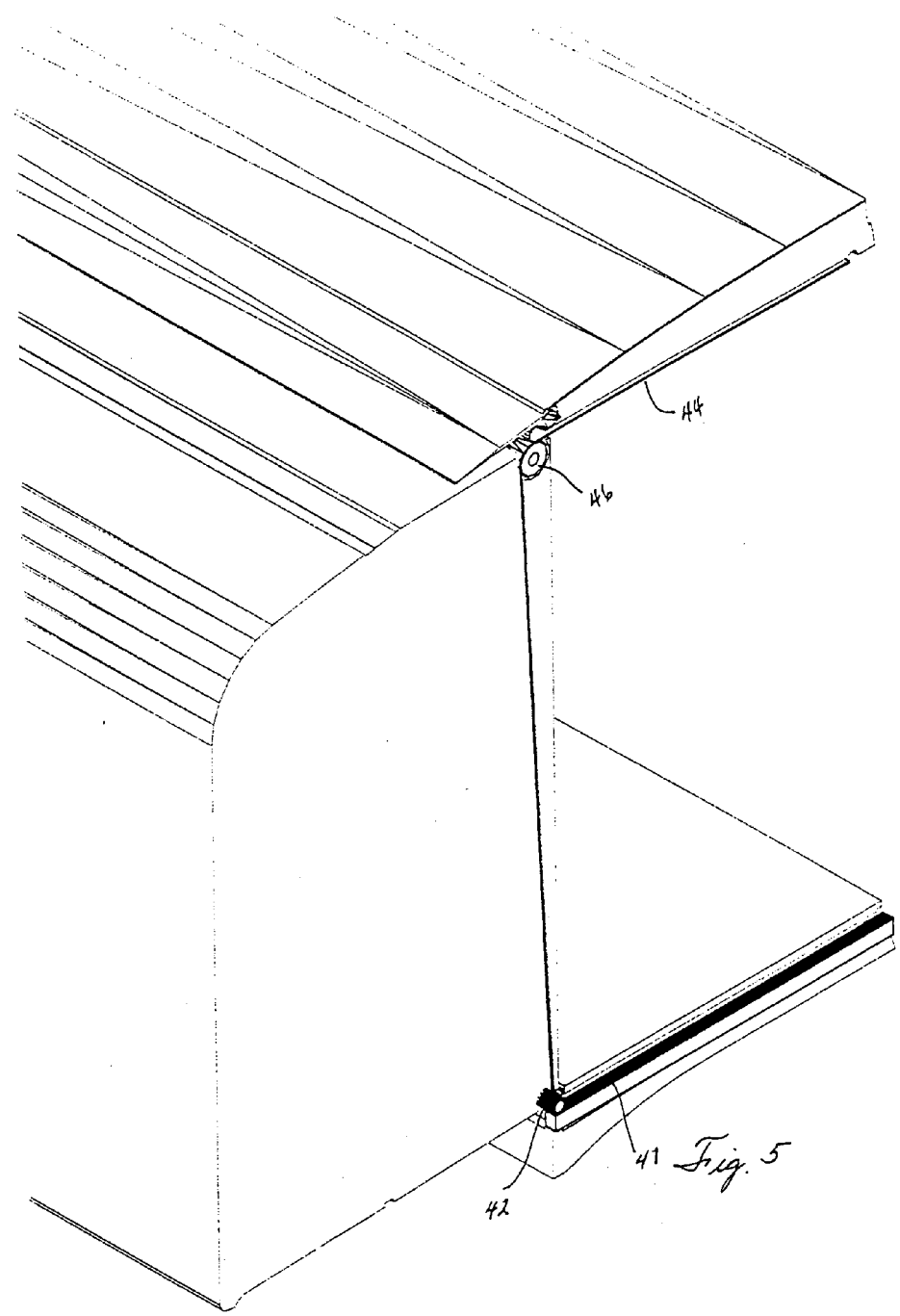

LUXURY RECREATIONAL VEHICLE

RELATED APPLICATIONS

This application claims the benefit of U.S. Provisional Applications No. 60/483,824, filed Jun. 30, 2003. This application is herein incorporated in its entirety by reference.

FIELD OF THE INVENTION

The invention relates to recreational vehicles, and more particularly, to improvements to luxury recreational vehicles that provide added functionality within a limited space.

BACKGROUND OF THE INVENTION

One of the fastest growing segments of both the housing and transportation industries is the motor home. Many people, particularly retired people are making the motor home their only residence.

Motor homes have evolved from busses, trucks, and vans to the dedicated chassis, built from the ground up to be a motor home. Market demand for more functional space has evolved the "bump out" or "slide out", an enclosed section that pushes out from the side to expand the living area. Some units even have opposite sides move out to expand the width of the living area from 8' to 12' or more.

The interior architecture of motor homes draws heavily from residential home design. Motor homes today, however, have most of their furniture fixed in one position. This tends to define a given space to one function, with the exception of couches and dinettes that are convertible into beds. The ability to rearrange furniture allows for increased flexibility in the use of limited space. With limited space in the cabin of a recreational vehicle, the space that is available must be used in the most efficient way possible, often for a variety of functions.

Luxurious amenities such as hot tubs and king size beds take up valuable floor space, are not known to be readily movable, and inhibit flexible and varied utilization of space. Often the penalty in lost floor space exceeds the pleasure derived from their availablity, and the customer prefers to forgo the luxury.

In an effort to increase usable space available to recreational vehicle consumers, and allow those users greater outdoor exposure, many manufacturers are installing roof decks, taking up substantially the entire length of the vehicle. These decks, however, are narrow as a result of the narrow configuration of the roof of the vehicle. These decks likewise use roof space that might otherwise be used for utilitarian mechanical devices, such as heating and cooling modules, moon-roofs, solar panels, and skylights.

Clearly what is needed is a recreational vehicle capable of providing luxurious amenities in an ample and flexible living space.

SUMMARY OF THE INVENTION

One embodiment of the present invention provides a recreational vehicle, that vehicle comprising a living space extension, disposed within the exterior wall of the vehicle, at least one tension cord; and a plurality of tension cord guides disposed on the extension, wherein the tension cord is received.

Another embodiment of the present invention provides such a vehicle wherein the tension cord comprises a belt having teeth.

A further embodiment of the present invention provides such a vehicle wherein the teeth are configured in a self-centering geometry.

One embodiment of the present invention provides a recreational vehicle, that vehicle comprising: a living space extension, disposed within the exterior wall of the vehicle; at least one living space actuation, load carrying, and centering system whereby the living extension is extended and retracted; the system comprising: at least one rack; at least one pinion having a plurality of teeth, the teeth configured to engage corresponding teeth in the at least one rack; side teeth and the corresponding teeth being configured in a self centering geometry.

Another embodiment of the present invention provides such a vehicle wherein the self centering geometry is selected from the group of geometries consisting of helical teeth, moon shaped teeth, chevron shaped teeth, and polygonal shaped teeth.

A further embodiment of the present invention provides such a vehicle wherein the at least one pinion comprises first and second synchronously driven pinions disposed proximate to onboard opposing sides of the living space extension.

Still another embodiment of the present invention provides such a vehicle wherein the teeth of the first pinion are disposed at an opposing angle to the teeth of the second pinion.

One embodiment of the present invention provides a recreational vehicle, the vehicle comprising: A deck disposed on at least a portion of the vehicle; At least one folding deck extension, the extension being connected by hinges to both at least one side wall skin panel and a chassis of the vehicle, the sidewall skin panel forming a parapet; and wherein the at least one side wall skin panel is actuatable.

Another embodiment of the present invention provides such a vehicle further comprising a deployable railing attachable to the parapet, so as to complete an enclosure of the perimeter of the deck.

A further embodiment of the present invention provides such a vehicle wherein the extension is pneumatically actuated.

Still another embodiment of the present invention provides such a vehicle further comprising folding benches disposed on inboard sides of the parapet.

A still further embodiment of the present invention provides such a vehicle wherein the folding benches comprise inflatable cushions.

One embodiment of the present invention provides a recreational vehicle, that recreational vehicle comprising: a deployable stringer to which are attached; a sliding landing; a sliding tread; wherein the sliding tread and the sliding landing are configured slide into a chassis of the recreational vehicle, thereby drawing the stringer into proximity with the chassis.

Another embodiment of the present invention provides such a vehicle further comprising at least one folding tread, the folding tread configured such that when the stringer is deployed, the folding tread engages both the stringer and the chassis.

A further embodiment of the present invention provides such a vehicle further comprising a hand rail coupled to the stringer.

One embodiment of the present invention provides a system for the synchronous, parallel actuation of a bump out, that system comprising: at least one rack; at least one pinion having a plurality of teeth, the teeth configured to engage corresponding teeth of the at least one rack; side teeth and the corresponding teeth being configured in a self centering geometry; at least one tension cord; a plurality of tension cord guides disposed on the bump out, wherein the tension cord is received.

Another embodiment of the present invention provides such a system wherein the self centering geometry is chosen from the group of geometries consisting of straight teeth, angled teeth, half moon teeth, chevron shaped teeth, and helical teeth.

A further embodiment of the present invention provides such a system wherein the at least one tension cord and the at least one rack comprise a belt having teeth.

Still another embodiment of the present invention provides such a system wherein the tension is constant.

One embodiment of the present invention provides a multipurpose tub system, the system comprising: a tub surround; a tub, disposed in the tub surround; a magazine, disposed beneath the tub surround; a deployable lid, stowed in the magazine; a deployable bed, stowed in the magazine; and a tub actuation system, whereby the tub is horizontally displaced to allow access to the magazine and the interior of the tub surround.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5 is a perspective view of a bump out actuated by a synchronous parallel actuation system configured according to one embodiment of the present invention.

DETAILED DESCRIPTION OF THE INVENTION

Figure 1:
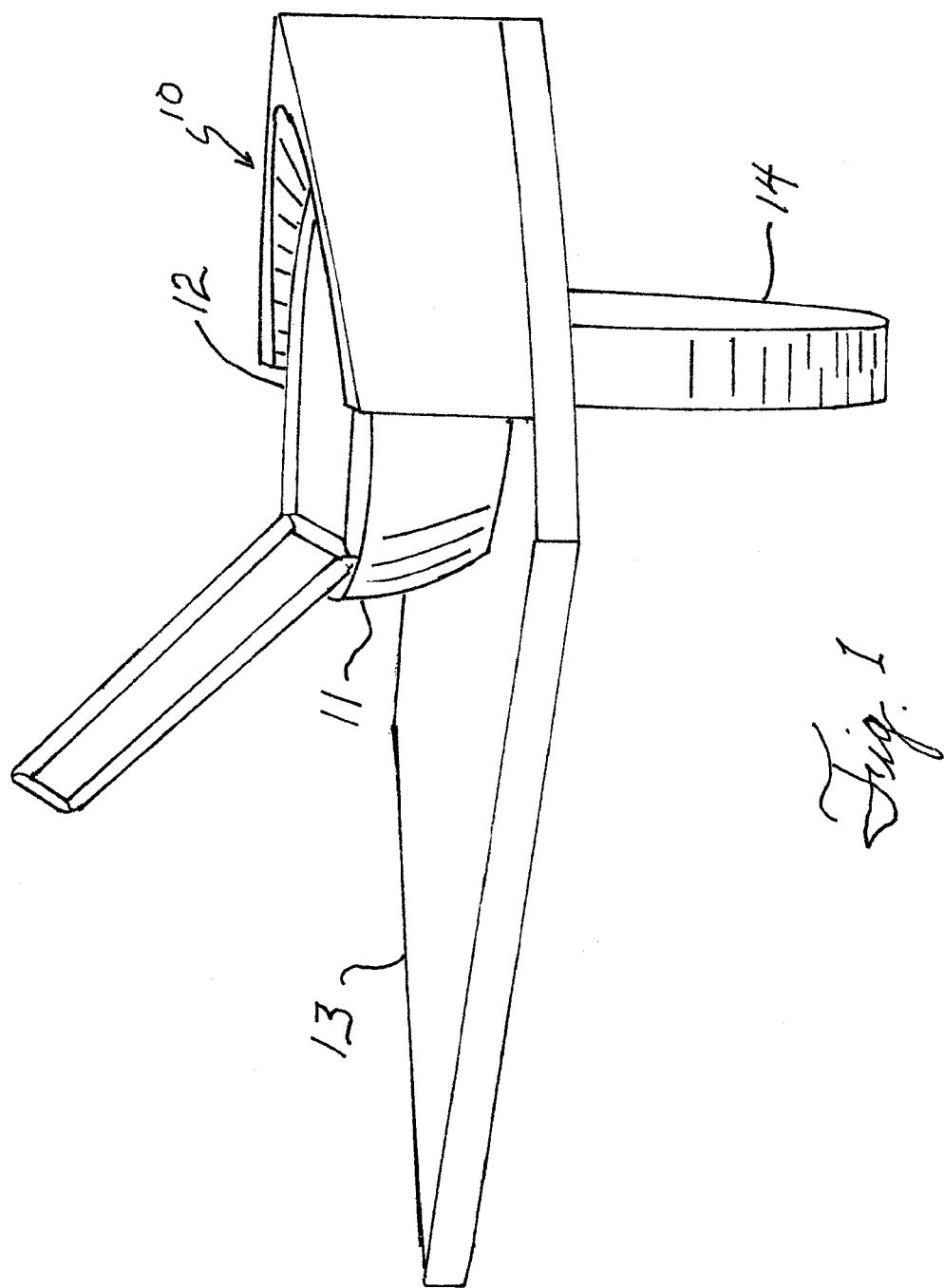
FIG. 1 is perspective view of a tub system, configured according to one embodiment of the present invention.
Figure 2:
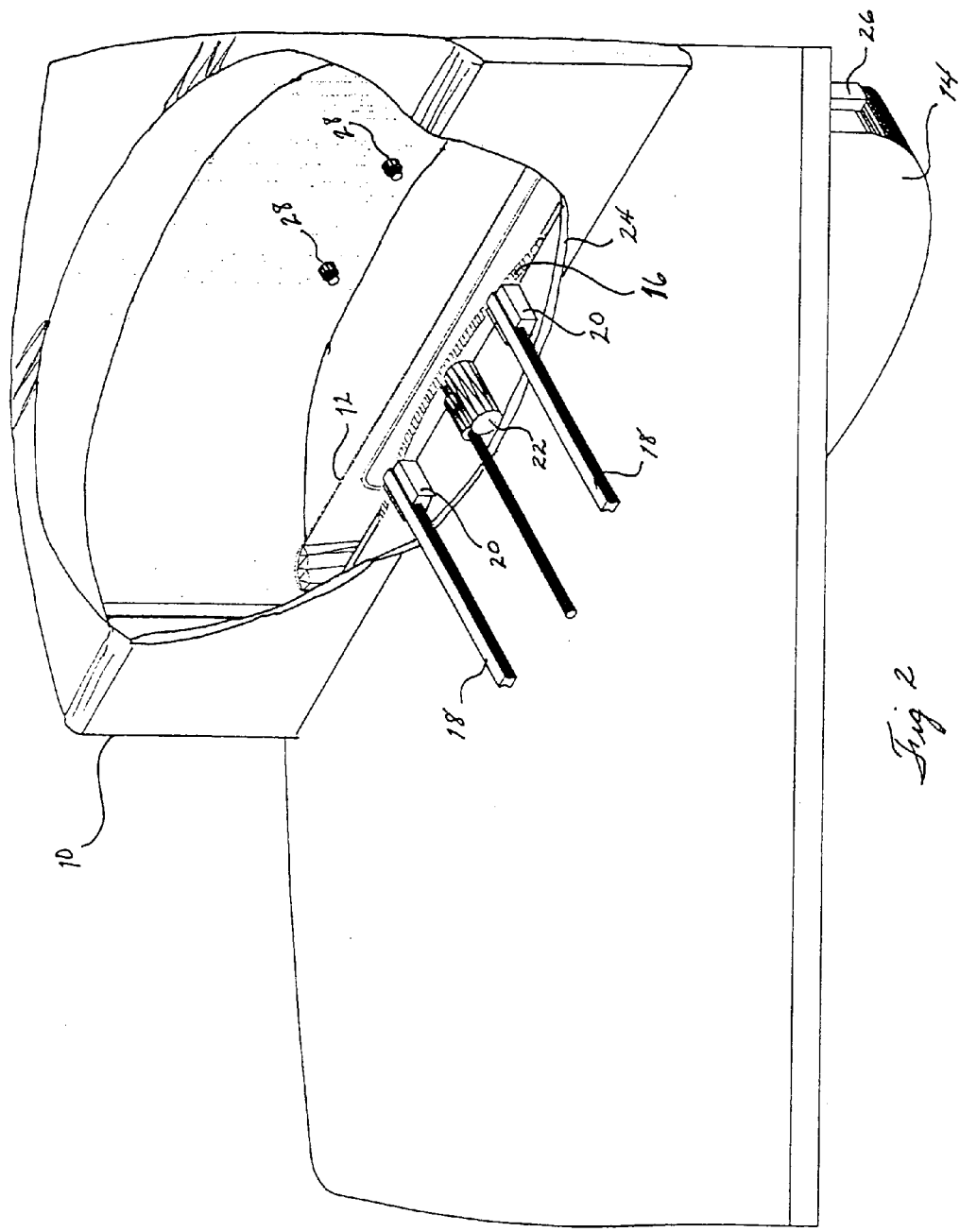
FIG. 2 is a perspective view of a tub surround and accessory magazine, configured according to one embodiment of the present invention.

FIGS. 1 and 2 illustrate one embodiment of the present invention wherein a tub surround 10 is configured to receive a tub 11. A bed frame 12 is provided which extends over the tub 11 when the tub 11 is not in use. This bed frame 12 is configured to be folded into a magazine 14 when not in use. A cover 16 is also provided for the tub, which is also configured to be storable in the magazine 14. The tub surround sits on the floor 13 and the magazine 14 extends below the level of the floor 13. The tub, not illustrated in FIG. 2, rides upon two profile linear motion bearing ways 18 that attach to the bottom of the tub and move in profile bearings 20. This outward travel permits access to the magazine 14 and interior of the tub surround 10. Those ways 18 and bearings 20 are configured to carry the cantilevered weight of the tub when extended. When retracted, the ends of those ways 18 engage a cam follower (not shown) under them that lifts them slightly, stabilizing the tub and pushing the top lip of the tub tightly against the lip of the surround. The ways 18, in some embodiments, are inclined so the tub drops slightly as it moves out to allow better clearance for the top 16 or bed 12 to deploy.

An actuator 22 is provided for actuating the tub. This actuator 22, according to one embodiment, is a motor attached to a ball nut and fixed to the lip 24 of the surround. The actuator drives a ball screw attached to the tub. The actuator 22, according to one embodiment, is a ball screw but in alternative embodiments may be a magnetically coupled rod-less cylinder, a belt, cable, chain, or rack gear. The actual travel of the tub requires little force but the last push to engage the tub at the end of retraction does take more force.

According to one embodiment, the bed 12 and cover 16 travel on cam followers in ways 26. Those ways 26 profile at the top to cause the cam followers to tip the cover or bed from the vertical to a horizontal position.

Self-sealing hydraulic plugs, or other connectors 28 may be provided, configured to mate with the tub when in a retracted position so as to provide water supply or return. Other connectors may provide electricity to lights or jets.

According to one embodiment, rather than a traditional mattress, an inflatable mattress may be used, such as that sold under the trademark SELECT COMFORT®. SELECT COMFORT® is a registered trademark of the Select Comfort Corporation, and the applicant makes no claim regarding that mark. In contrast to the SELECT COMFORT® brand mattress, some embodiments of the present invention, provide additional foam padding disposed within the bladder. In general, an inflatable mattress would store more easily than a traditional mattress. Only the contour of the frame 12 must be stored in the magazine 14. The contour of the frame 12 rises half the inflated height of the inflated bed at the edges. The bed attaches to the top of frame edge 12 so that when deflated with a vacuum, the mattress will conform to the inside of the profile leaving nothing hanging beyond the frame 12. To be stowed, the mattress is evacuated, and the bed frame 12 is folded. The evacuated mattress facilitates a narrow fold. The bed may then be lowered smoothly into the magazine. Once in the magazine, the vacuum may be released, allowing foam padding within the mattress to partially re-inflate, pressing the bed frame 12 against the walls of the magazine 14 preventing the bed form vibrating in transit. The bedding can be attached to the mattress with Velcro® or other fastener so it retracts with the mattress or it can be stripped and stored in a compartment in the surround behind the tub. Such a compartment may also house cushions with which to convert the cover 16 into a comfortable seat. The cover 16 can also be a support surface, shelf, table, counter, credenza, or other load bearing surface for passengers when traveling. One of ordinary skill in the art will readily appreciate that this space saving configuration can be applied with equal advantage in other space confined situations, such as boats, plans, apartments, cruise ships, and railroads.

One skilled in the art will readily appreciate that a more traditional mattress, such as those used in convertible furniture such as sleep sofas or cots, may be used, though a larger magazine would be required.

Both the cover 16 and the bed 12 have a thin horizontal flange at their back edge that is captured between the top of the tub and the surround 10 when the tub is retracted. This holds the top 16 or bed 12 tightly in position when extended.

Figure 3:
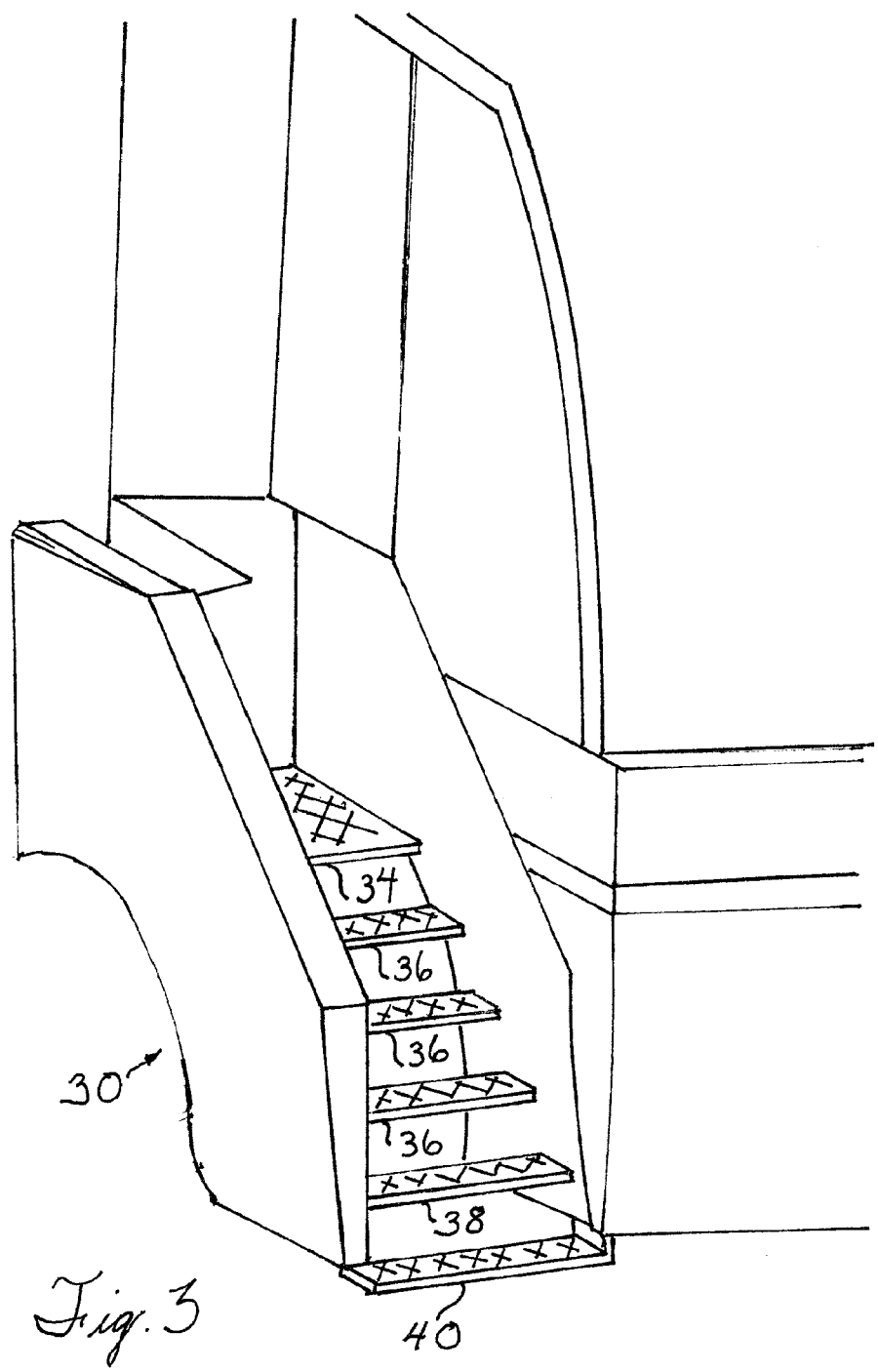
FIG. 3 is a perspective view of a deployed foldable stair, configured according to one embodiment of the present invention.
Figure 4:
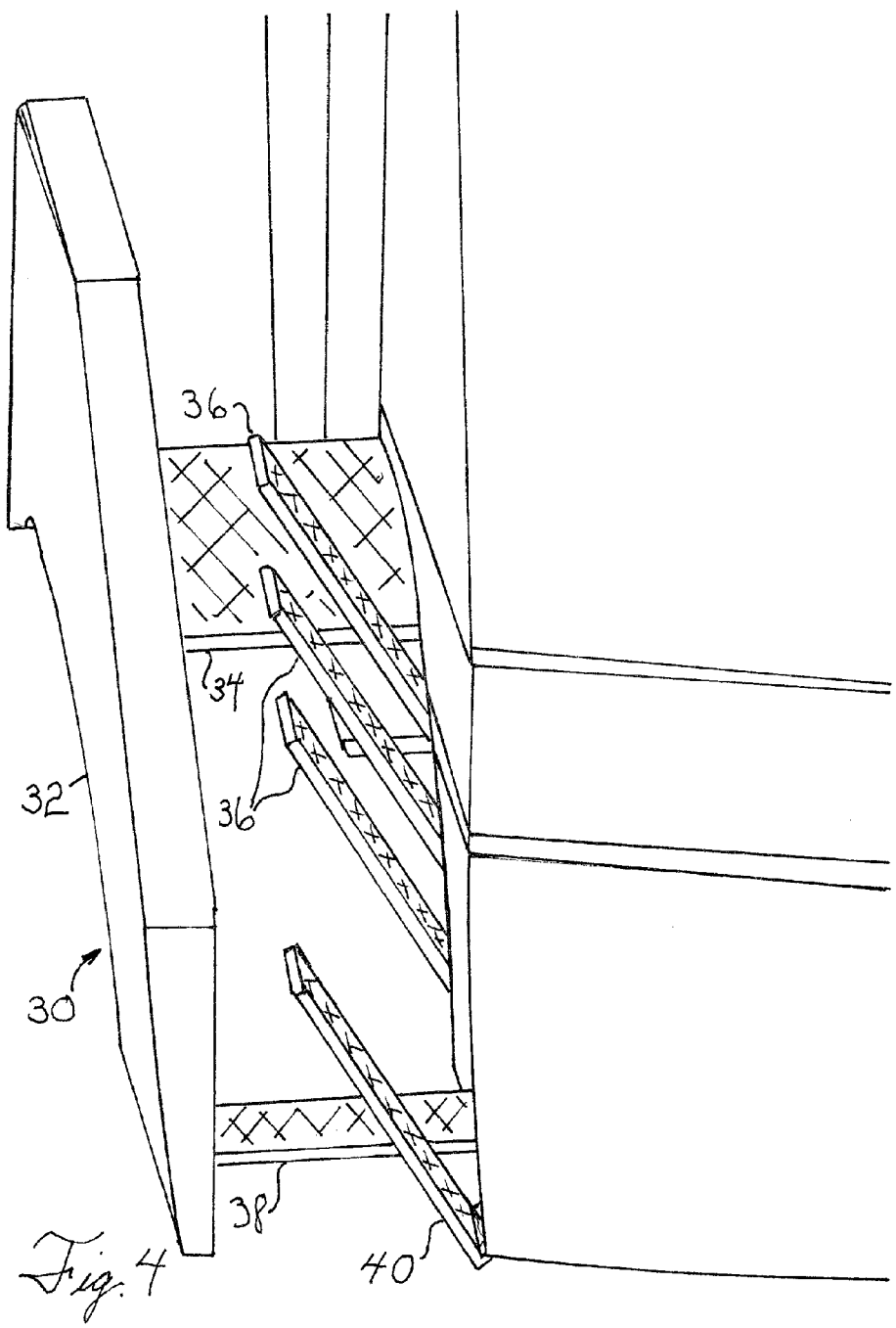
FIG. 4 is an illustration of a partially retracted folded stair configured according to one embodiment of the present invention.
Figure 6C:
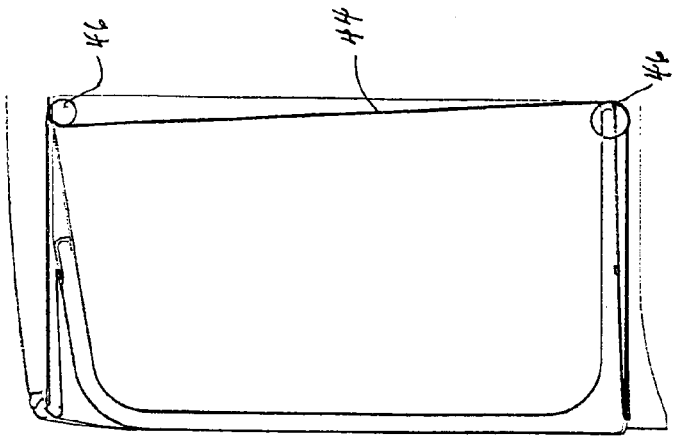
FIG. 6C is a cross sectional elevation view of an retracted bump out actuated by a synchronous parallel actuation system configured according to one embodiment of the present invention.
Figure 6B:
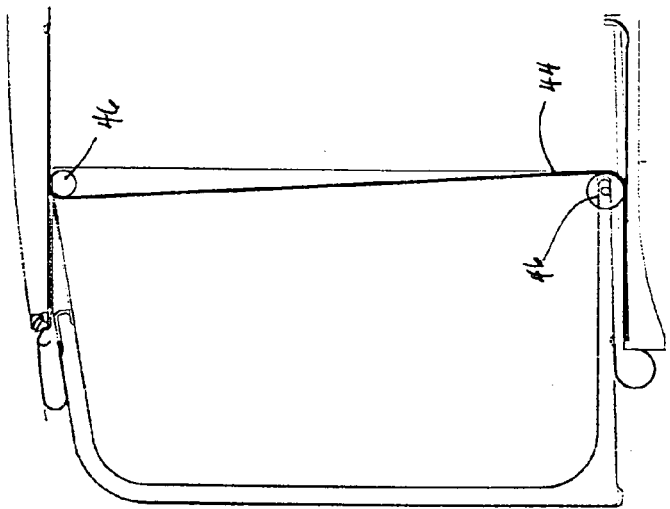
FIG. 6B is a cross sectional elevation view of a retracting bump out actuated by a synchronous parallel actuation system configured according to one embodiment of the present invention.
Figure 6A:
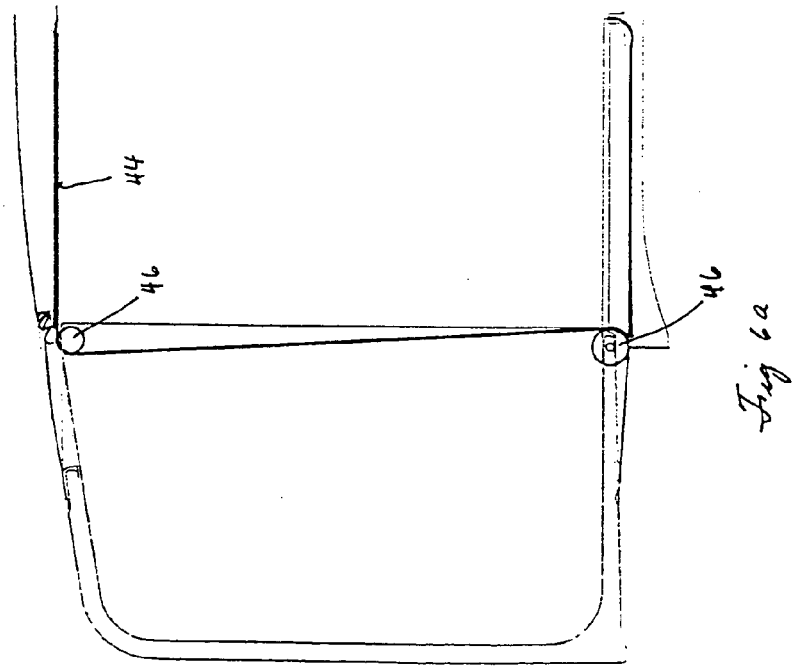
FIG. 6A is a cross sectional elevation view of an extended bump out actuated by a synchronous parallel actuation system configured according to one embodiment of the present invention.

To provide ready access to the passenger compartments of the vehicle without substantially diminishing the cabin space of the recreational vehicle, one embodiment of the present invention, illustrated in FIGS. 3–4, provides at least one door configured with a stair case 30 that, when in use extends from the exterior of the vehicle to provide access from the door to street level, and is retractable for when the vehicle is in motion. At least two landing treads or steps rigidly connected to a side hand rail structure and are slidably connected to the vehicle, proximate to the door, for extension and retraction. The remaining intermediate treads or steps of the stair are hingedly connected either to the stair assembly or to the body of the vehicle, so as to stow between the stair assembly and the body of the vehicle when the stair is retracted. Specifically, in one embodiment, the stair is configured with a stringer 32 having in one embodiment an integral hand rail, a sliding landing, 34, a plurality of intermediate folding treads 36, at least one sliding tread 38, and bottom folding tread 40. When the stair is extended, as in FIG. 3, the handrail/stringer assembly 32 forms a wall on one side of the stair, opposing the wall of the vehicle. The stair is parallel with the main axis of the vehicle. The landing 34 facilitates entrance and egress from the door. The folding stair, located entirely outside the passenger compartment of the vehicle, minimizes intrusion into the floor space of the cabin, and in one embodiment, the folded stair and wall together are only approximately 3 inches thick. One of ordinary skill in the art will readily appreciate that other hinged configurations for the treads would be within the scope of the present invention. This embodiment provides both positioning independent of the ground, and space saving folding treads. Alternative embodiments may provide stairs having only sliding treads and landings, or only folding treads and landings.

Figure 7:
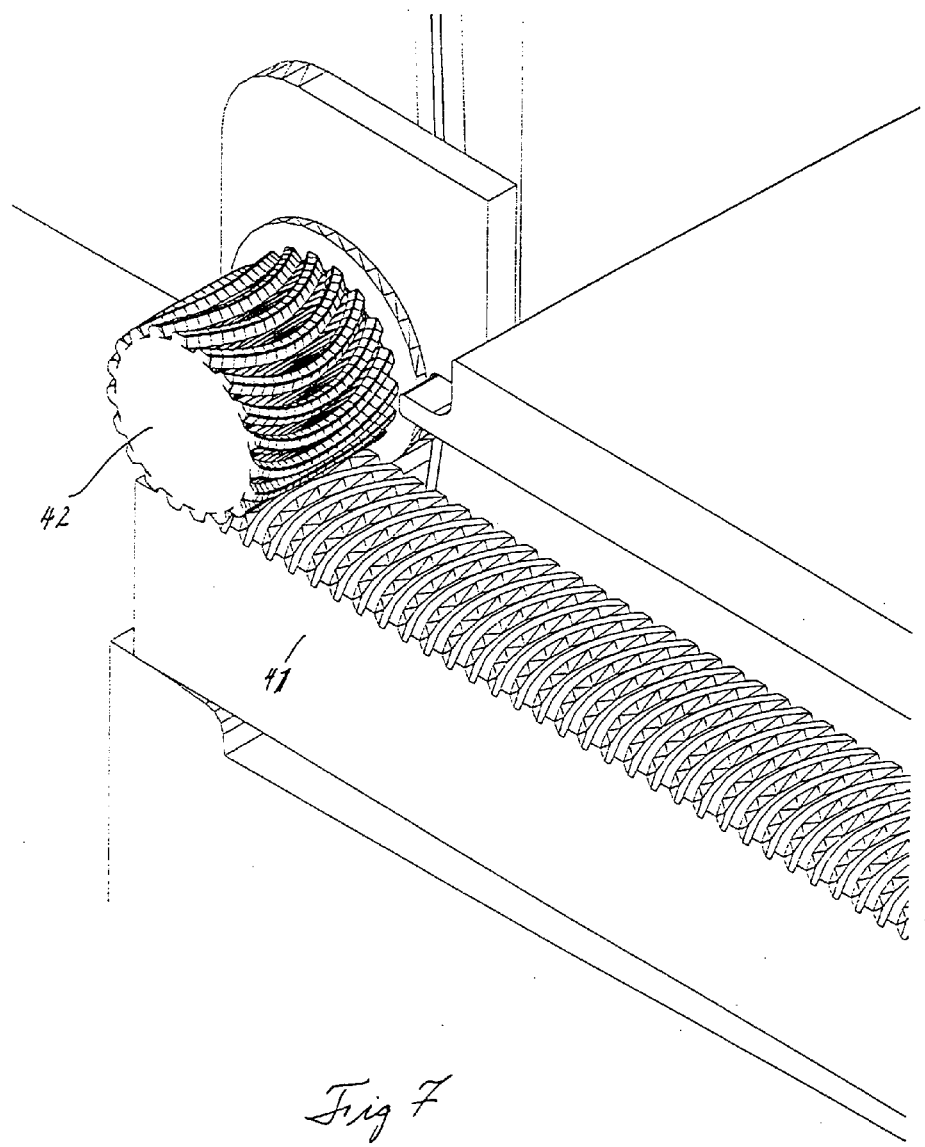
FIG. 7 is a perspective view of a rack and pinion system configured according to one embodiment of the present invention.

One embodiment of the present invention provides at least one "bump out" side or living space extension. This bump out is actuated by a synchronous parallel actuation system, which works with tension cords to maintain alignment of the bump out to the chassis during extension and retraction. As illustrated in FIGS. 5, 6A, 6B, and 6C a parallel synchronous actuator is provided for the retraction and extension of the bump out. According to this embodiment, racks 41, mounted in the body of the recreational vehicle, are configured to receive pinions 42 which act both to extend and retract the bump out, and to synchronize the movement of the opposing ends of the bump out. The pinions 42, disposed at the inboard corners of the bump out floor, may be configured to have teeth of a half moon shape, helical shape, chevron, angled or straight shape or other self centering geometry. The rack must be configured in such a way to match the pinions. Helical pinions have the advantage of both centering the pinion 42 on the rack 41 and of providing smooth, continuous movement as the rack 41 is in continuous contact with the pinion 42 preventing the pulsing one encounters with a square cut pinion. Half moon teeth likewise center the pinion within the rack. As such helical and half moon shaped teeth are capable of being used as load bearing wheels as well as guides, providing extremely accurate alignment of the bumpout without other types of guides. An embodiment utilizing half moon teeth is illustrated in FIG. 7. The pinions can be driven by gear motors or other such drive mechanisms mounted in the bump out floor. The pinions can be synchronized by being disposed on a single shaft or may be driven separately by synchronous motors. Alternative embodiments may utilize claims, cables, belts, cylinders or other appropriate means to extend and retract the bump out.

According to one embodiment, the tension cord 44 of the synchronous parallel actuation system may be disposed at opposing ends of the bump out, and riding over at least two idlers or other guides 46 disposed respectively at the top and bottom of the inboard side of the bump out or in the roof and floor of the bump out. Such a configuration facilitates the further extension of the bump out than is known in the art, for example a bump out, configured according to one embodiment of the present invention, of fifty inches may extend a full forty-seven inches. One skilled in the art will appreciate that a bump out may be produced in accordance with embodiments of the present invention that extends up to eight feet from the side of the coach. In an embodiment having roof and floor idlers, the cord travels through the outboard wall of the bump out. In such an embodiment, windows or other openings may be disposed in the end of the bump out. One of ordinary skill in the art would appreciate that this latter embodiment would require more idlers to insure proper cord movement, without obstructing the usable space provided by the bump out. One of ordinary skill in the art will readily appreciate that the tension cord could be disposed in other parts of the bump out, which would necessitate alternative idler configurations. Bump outs of great depth or length may require additional tension cords located within the bump out to prevent misalignment of the bump out and an asynchronous movement. Such additional cords may be hidden in interior walls or in the roof and floor of the bump out. According to one embodiment, the idlers rotate independently of the pinions, but may be disposed on the pinion shaft. The cord is under continuous tension throughout the extension and retraction of the bump out.

The cord may be similar in construction to a timing belt, being, in one embodiment, steel reinforced, either with or without teeth. Other possible cord constructions include, but are not limited to chains, bands, and cables. Materials used in such construction could include fibers, bands, or wires of steal, polymers, or other materials of high tensile strength that flex with minimal or no stretching, which may or may not be disposed in a polymer matrix.

The synchronous parallel actuation system, according to some embodiments, when used in conjunction with bump out designs, such as that disclosed in PCT Application No. PCT/US02/41854 by the same inventor and incorporated herein for all purposes, maximize the interior floor space advantage provided by using bump outs.

Figure 8:
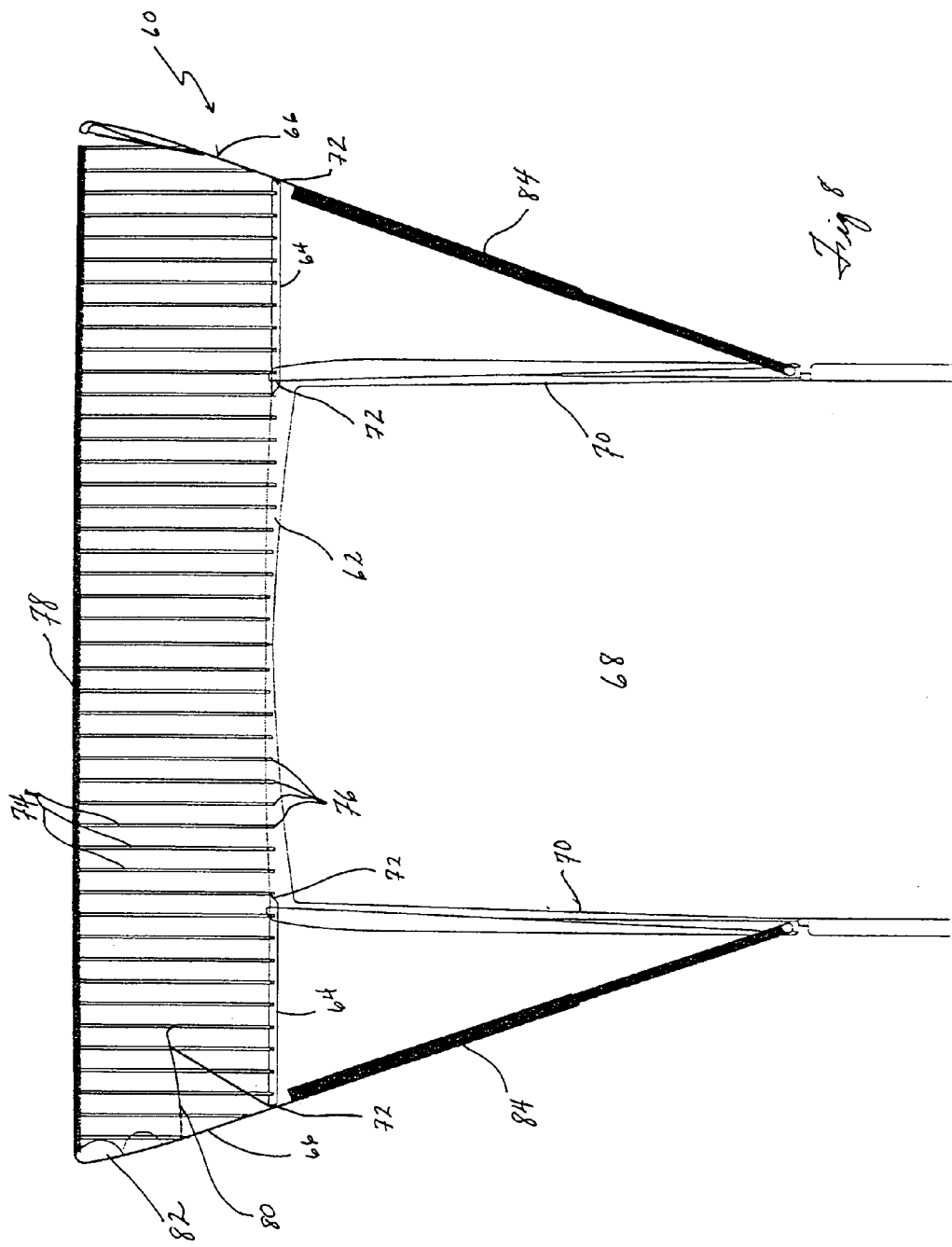
FIG. 8 is a cross sectional elevational view of a recreational vehicle having an extended roof deck configured according to one embodiment of the present invention.
Figure 9:
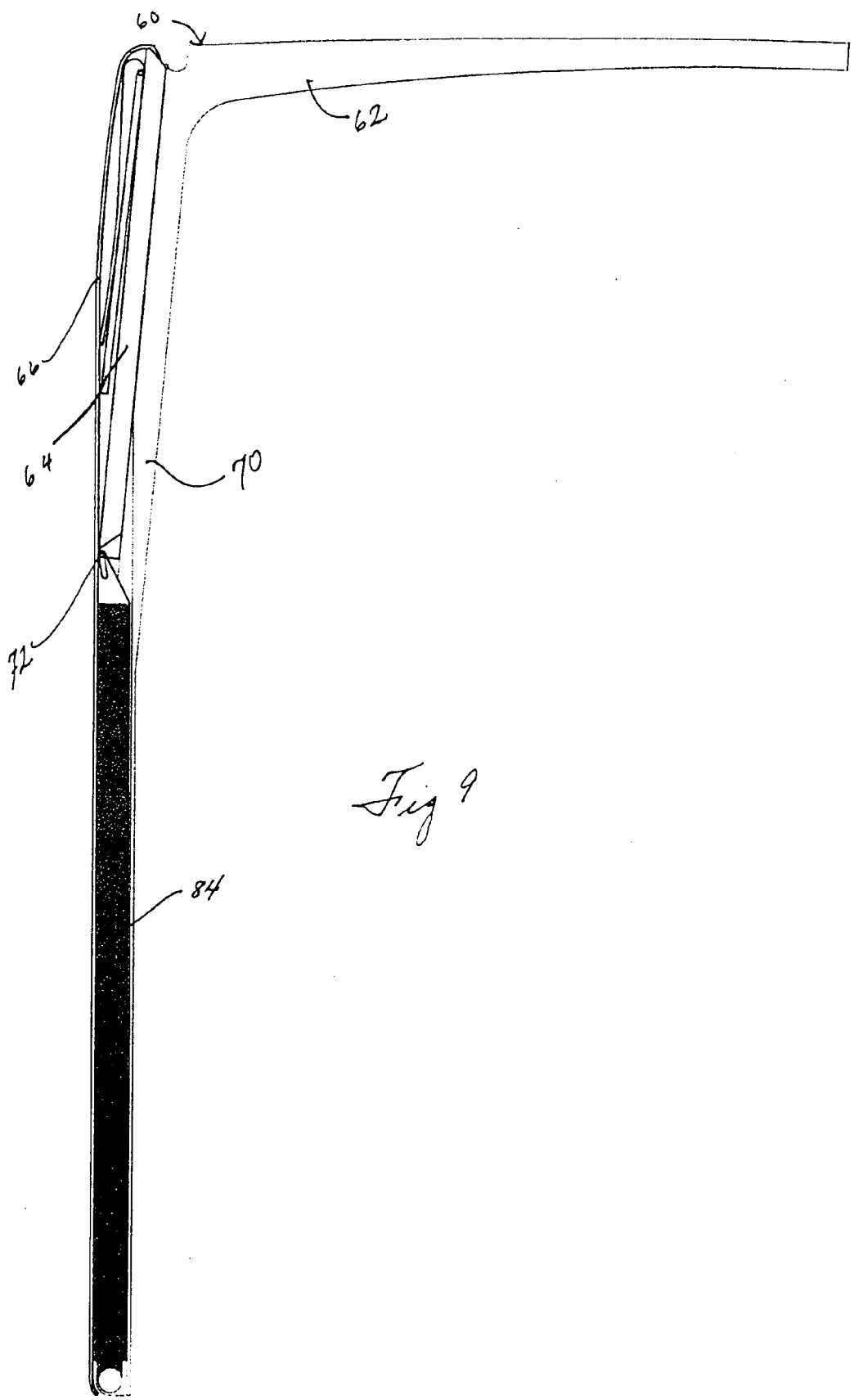
FIG. 9 is a cross section elevational detail of a recreational vehicle having a folded roof deck configured according to one embodiment of the present invention.
Figure 10:
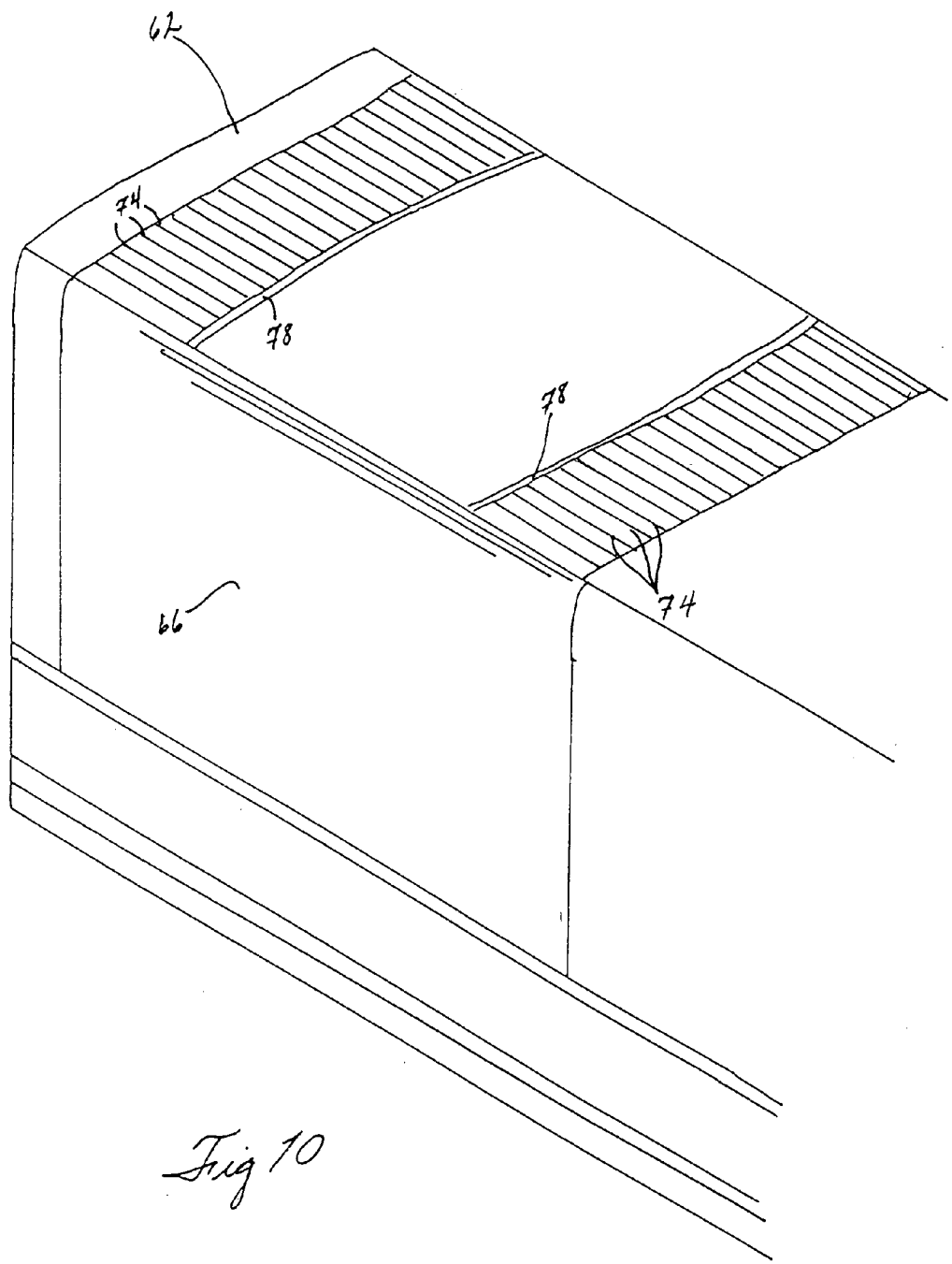
FIG. 10 is a perspective view of a recreational vehicle having a folded roof deck configured according to one embodiment of the present invention.

One embodiment of the present invention, illustrated in FIGS. 8–10 includes a deck 60 located on the roof of the vehicle 62. To facilitate both the generation and storage of solar energy and to provide the functionality of a sundeck, one embodiment of the present invention provides a sun deck covering only part of the length of the vehicle, the remainder being available for solar panels and other mechanical equipment. One skilled in the art will readily appreciate that, while this embodiment relates to a deck covering only part of the roof, other embodiments where the deck covers all or a greater part of the roof are within the scope of the invention. In order to maximize available deck space, the deck 60 is configured with floor extensions 64. These extensions are positioned by raising the outside skin 66 of the sidewall, supporting each extension. Exterior sections of the vehicle skin 66 are raised, as these sections are raised, they are angled way from the chassis of the vehicle by the extensions 64 which are attached by hinges to both the outside skin 66 and the point where the roof 62 meets the sidewall 70, and to the movable skin section 66 with hinges 72. The raised skin sections 66 form a parapet at the edge of the deck area, and in one embodiment, the sections are provided with fold down benches 80.

On sides of the deck 60 where there are no raised sections to form a parapet, banisters 74, hingebly mounted at one end in recesses 76 on the roof of the vehicle 62, support a railing 78. The railing 78 is slightly flexible, allowing it to compensate for the difference in profile between the deployed and folded positions. The rail 78 is spliced a number of times to allow for the folding of the deck components. The balusters 74 are closely spaced to protect children. The parapets are likewise designed to be safe for children, when the seats are folded, the inside of the side skin is smooth, inhibiting climbing and falls by a child.

Referring to FIG. 9, the top of the sidewall skin 66 is curved inward, and is designed, when retracted, to engage a protruding edge of the folded deck floor extension 64 proximate to the hinge between the deck floor extension 64 and the roof of the chassis 60. The sidewall skin 66 is positioned by actuators, 84, which according to one embodiment are pneumatic cylinders. These cylinders 84 are hingeably attached at the bottom to the wall of the vehicle 70. At its top, the cylinder 84 is attached to the side wall skin 66, and to a slotted hinge 72 whereby the floor extension 64 is attached to the skin 66 and the cylinder 84. The hinge 72 is provided with a slot that permits the cylinder 84 to extend slightly, disengaging the curve at the top of the skin 66 from the deck floor extension 64, thereby freeing the skin for extension of the deck. This slot likewise facilitates extension and retraction of the deck in other ways. For instance, the angle of the slot induces an initial outward movement of the cylinder 84, this movement prevents the cylinder 84 from directly binding on the floor extension 64 when extending. The angle of the slot, likewise, draws floor extension 64 tightly against the side of the vehicle 70 when the cylinder is retracted. The slotted hinge also allows any debris that has accumulated on the deck floor extension 64 to fall to the ground through a gap formed between the sidewall skin 66 and the floor extension 64 during the retraction process.

In one embodiment, the side skins are actuated by pneumatic cylinders 84. These cylinders are under constant pressure when the deck is deployed. Release of the pressure from the cylinders 84 results in the retraction of the deck. To prevent inadvertent release or the collapse of the deck in event of a cylinder failure, a locking mechanism is incorporated into the assembly, either directly into the cylinder 84 or otherwise. Air from the cylinder 84 is, in some embodiments used to inflate the seat cushions 82.

The deck system produces a wider usable space while hiding the entire deck system when not in use. The system maintains the lines and aerodynamics of the vehicle with no component of the deck system offering any additional wind resistance.

Other embodiments of the present invention may utilize expanded roof space to provide shade to the living compartment or extended solar paneling in lieu of deck space. Alternatively, bump outs could be provided with extensions, providing increased deck space. One skilled in the art will readily appreciate that apertures may be arranged in the skin to allow for windows without compromising the functionality or structural integrity of the roof extension system.

Figure 11A:
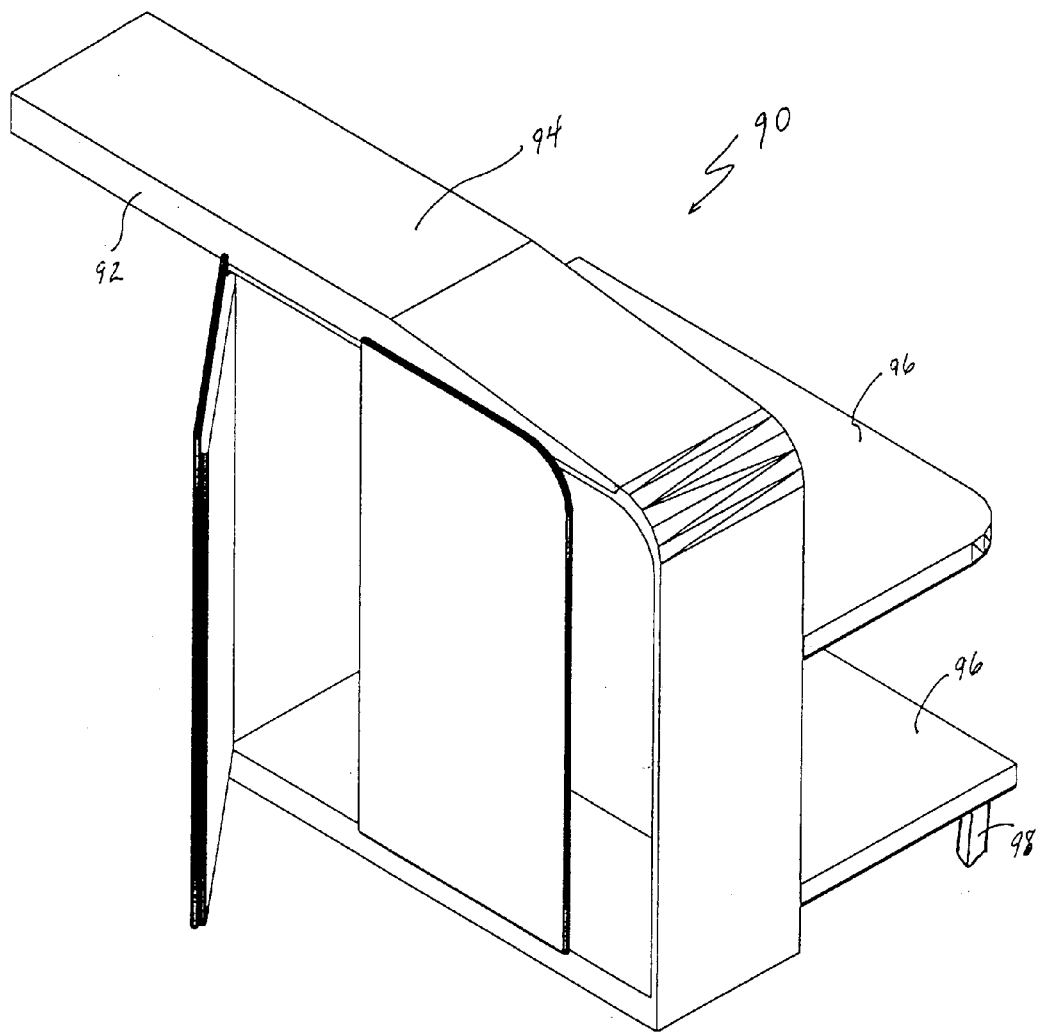
FIG. 11A is a perspective view of a movable partition module with deployed bunk beds and extended lintel configured according to one embodiment of the present invention.

Another embodiment of the present invention provides movable partitions and room dividers within the passenger cabin of the recreational vehicle. Space on recreational vehicles is limited. The introduction of flexibility to floor plan will optimize the utility of what space is available. The module may be freely repositionable within the cabin of the recreational vehicle, or have only a limited range of motion. According to the embodiments illustrated in FIGS. 11–13, a mobile module 90 may be provided. This module may be a closet, bar, cabinet, shelf or other such structure. One skilled in the art will readily appreciate that many door and drawer configurations are within the scope of the invention. If flexible piping or wiring is incorporated, a sink, appliance, or kitchenette may be located in the module.

Figure 11B:
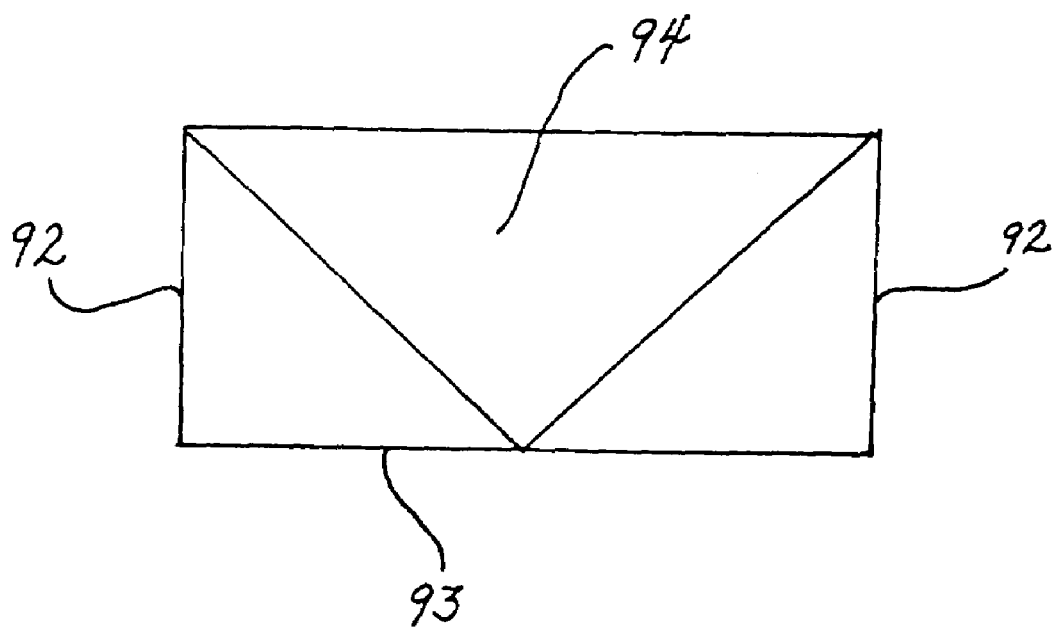
FIG. 11B is a cross sectional elevational view of a lintel as shown in FIG. 11A and configured according to one embodiment of the present invention.
Figure 12:
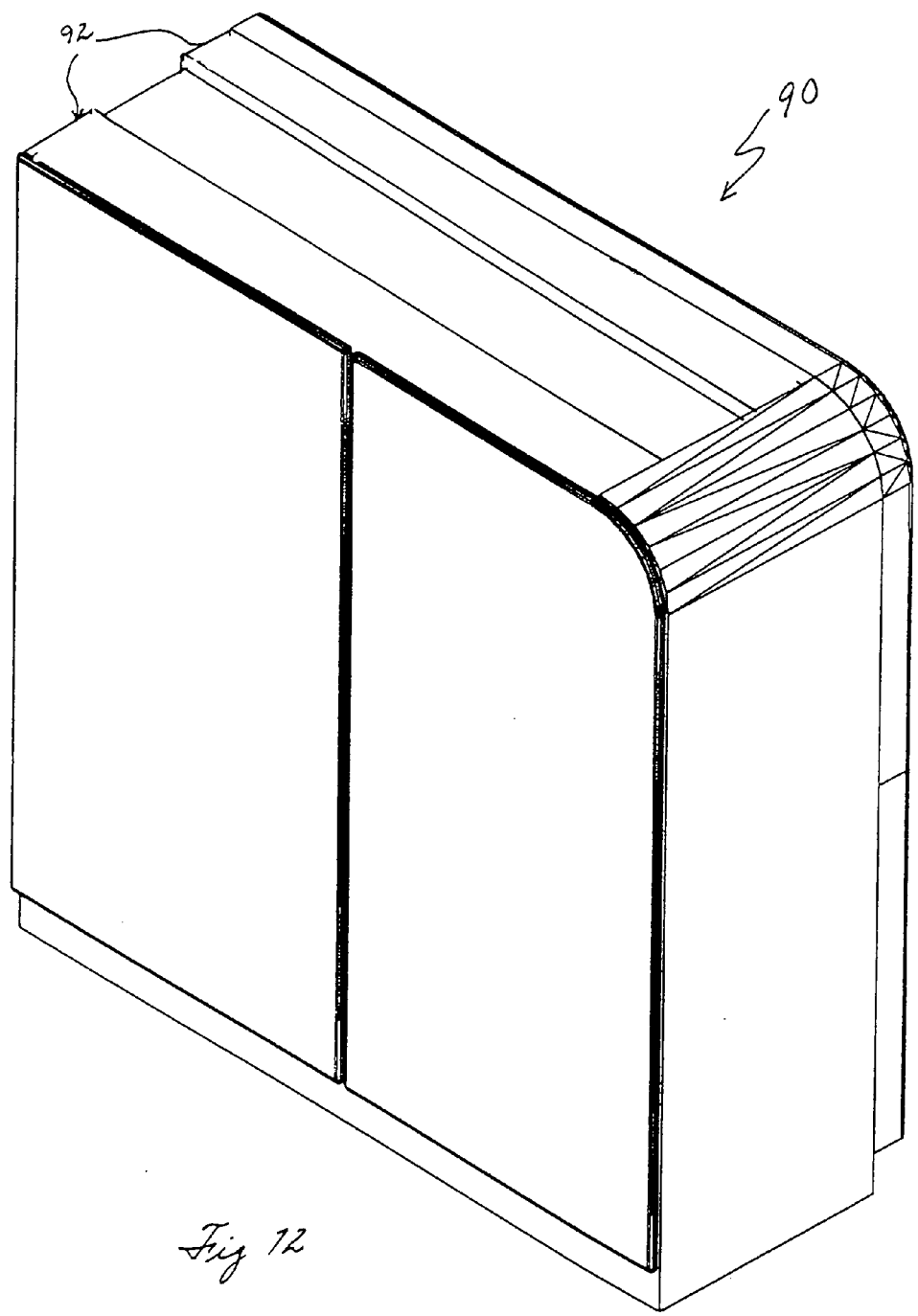
FIG. 12 is a perspective view of a movable partition module with folded bunk beds and retracted lintel configured according to one embodiment of the present invention.

The module 90 may be provided with flexible folding extensions 92 that are configured to be positioned between the top of the module 94 and the ceiling of the cabin. As illustrated in FIG. 11B, the folding extensions 92 are hingeably attached to a lintel bottom panel 93, which is configured to be stowed within the module 90 when not required. A pneumatic bladder 94 actuates the extensions 92 and, in one embodiment forms the top of the module. The flexible folding extensions 92, lintel bottom panel 93, and bladder 94 form an inflatable and retractable lintel that may be deployed between the movable module and a fixed module, another movable module, or the wall of the cabin. In one embodiment, the top of the module, is formed by the bladder 94, the bladder being connected to the extensions 92 and the center of the lintel bottom panel 93, in such a way to have a triangular cross section when inflated. The bladder 94 is disposed between the folded extensions and when inflated, deploys both laterally and vertically, drawing the extensions into a vertical alignment, closing the gap between the ceiling 110 and the module 90, as well as forcing the lintel to lengthen, or extend longitudinally from the module, and extend out from the side of the module. When the lintel is deployed, joining two modules or a module to a wall, a doorway is defined. According to one embodiment, a door 95 from the module may be configured to have a 180° range of motion, and to catch at either extreme so as to close either this doorway or the module. One skilled in the art will readily appreciate that various other means for closing this doorway may be provided within the scope of the present invention, other examples include, but are not limited to folding, pocket, or sliding doors.

Figure 13:
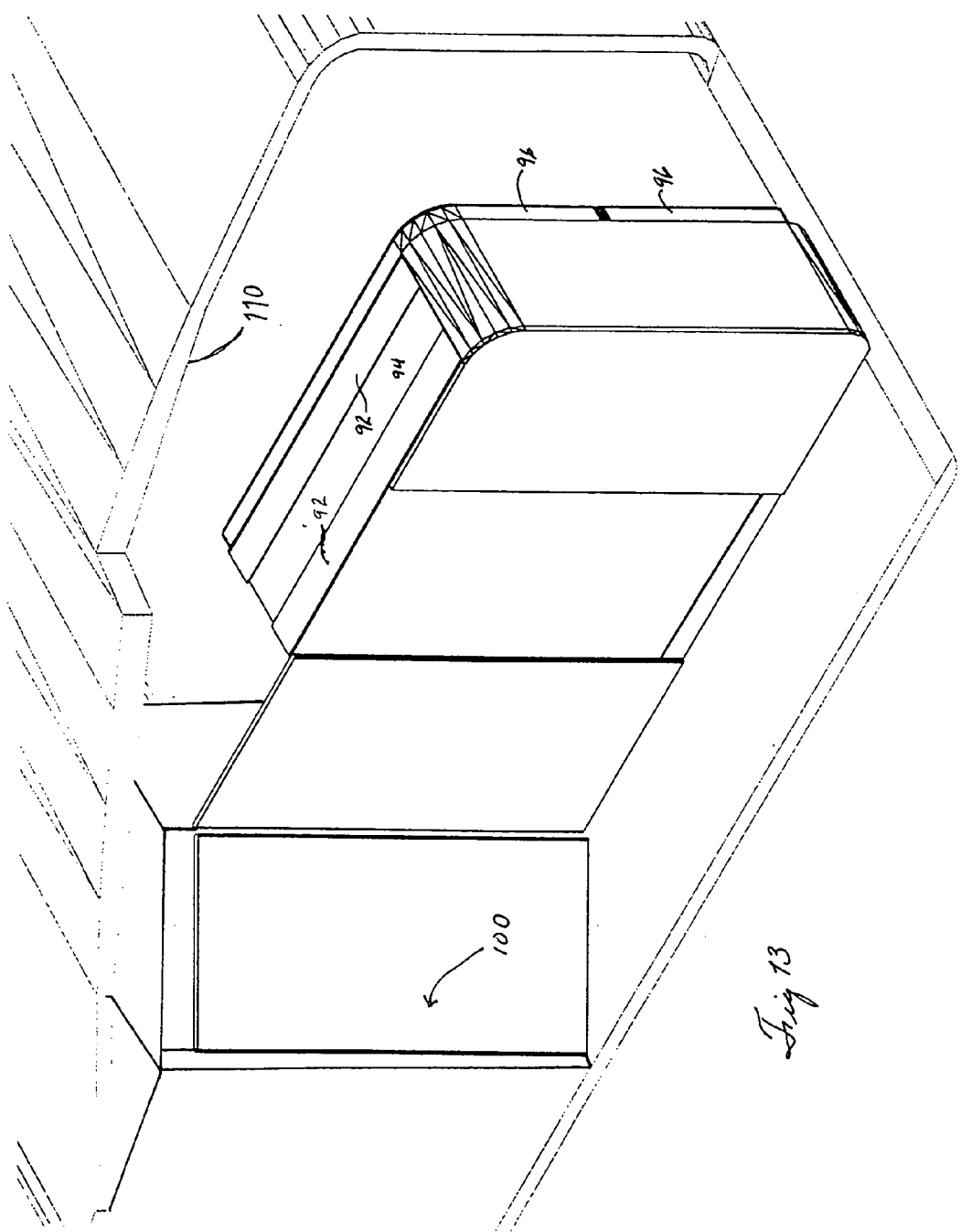
FIG. 13 is a cutaway perspective view of a recreational vehicle with a movable partition module, configured according to one embodiment of the present invention, dividing a room.

The module 90 may be either free standing and freely repositionable or connected to fixed modules 100 and having a limited range of movement as illustrated in FIG. 13. In one embodiment, an extendable and retractable lintel connects the mobile and fixed modules, facilitating the temporary division of the cabins of recreational vehicle. One example of a module that may be fixed is a bathroom. The fixed module 100 may be configured to be accessible from either side, facilitating the flexible and various use of the adjacent floor space.

According to one embodiment of the present invention, stowable bunk beds 96, such as those used in railroad sleeping compartments, or a Murphy bed may be mounted on one side of the module. The mattresses on these beds, in one embodiment of the present invention, are air mattresses, similar to that disclosed above as part of the bath assembly. If bunk beds are installed, the bunks may be configured to be converted into a couch, the top bunk being designed to unlock and lower to form a backrest, and the bottom forming a seat. In such an embodiment, inflatable mattresses may be configured with a second air bladder disposed beneath or within them that when activated, reconfigures the mattress into a more ergonomically comfortable couch cushion, further facilitating the transformation of the bunk into a couch. To provide added stability to the module 90 when the beds 96 are extended, the bottom bed, in one embodiment, is provided with at least one fold down leg 98, forming an outrigger or buttress to support the bottom bunk and counteract the force of the cantilevered upper bunk. One skilled in the art will readily appreciate that should ceiling height permit, more than one upper bunk may be provided.

Figure 14:
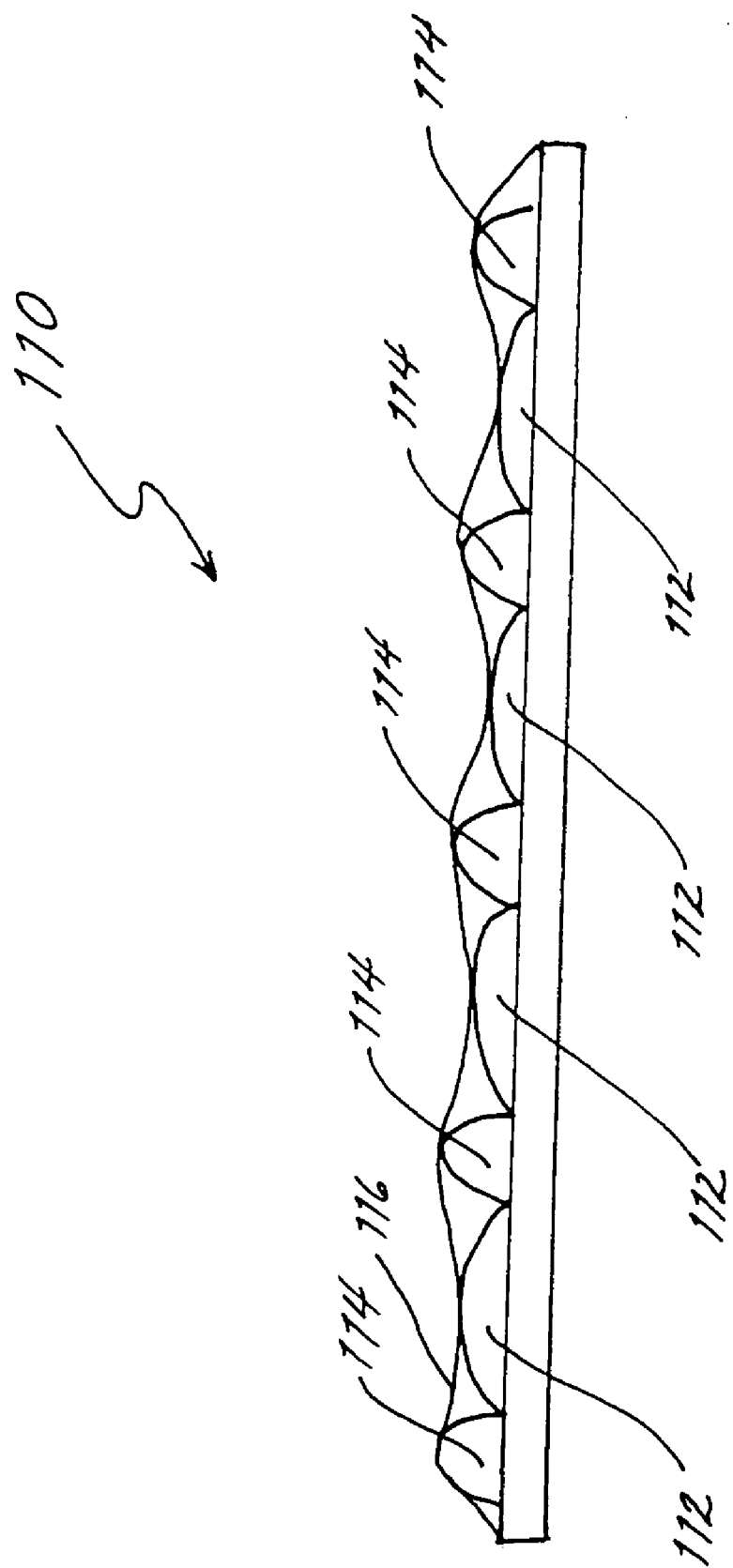
FIG. 14 is a cross sectional elevational view of a convertible mattress/four person bench configured according to one embodiment of the present invention.

One of ordinary skill in art will readily appreciate that inflatable reconfigurable furnishings have applications well beyond recreational vehicles. Home and office furnishings, outdoor or camping equipment, car and truck seats are all possible applications. The shape of a piece of furniture can be materially altered by the careful control of pneumatic pressure within a plurality of independently controlled bladders. This control can be provided either mechanically, manually, or via computer controlled manifolds. Examples of reconfigurable furnishings include, but are not limited to, seats that can be reconfigured to more comfortably support a user or adjust between users of different size; a mattress can be converted into a seat, or provided with an integral pillow. One such example is illustrated in FIG. 14 that shows a cross sectional elevation view of a mattress 110 that is configured to convert into an ergonomically contoured bench for four users. Seat bladders 112 are illustrated in as inflated, and are separated by bolster bladders 114. The seat bladders 112 and bolster bladders 114 are disposed with the mattress bladder 116, which is at least partially deflated when the mattress 110 is in seat mode. Each seat and bolster bladder may be independently adjusted as desired by the user. One of ordinary skill in the art will appreciate that these principles can be applied to various other applications, some more complex, others less, so as to facilitate more flexible and comfortable furnishings.

One skilled in the art will readily appreciate that the present invention extends beyond motor homes to encompass aircraft, watercraft, and other land vehicles, such as the crew cabins and coaches of long distance tractor-trailers. Still further applications may be in the fields of home construction, home furnishings, or office furnishings.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A recreational vehicle, said vehicle comprising:
   A deck disposed on at least a portion of a roof of said vehicle;
   At least one folding deck extension, said extension having first and second sides;
   Said first side being hingebly connected to an edge of said roof;
   Said second side being hingeably coupled to at least one sidewall skin panel;
   said sidewall skin panel forming a parapet along said second side of said extension; and
   wherein said at least one sidewall skin panel is actuatable, and
   wherein said second side is coupled to said sidewall panel at at least one point located midway between a top of said panel and a bottom of said panel.

2. The vehicle according to claim 1 further comprising a deployable railing attachable to said parapet, so as to complete an enclosure of the perimeter of said deck.

3. The vehicle according to claim 1, wherein said extension is pneumatically actuated.

4. The vehicle according to claim 1 further comprising folding benches disposed on inboard sides of said parapet.

5. The vehicle according to claim 4 wherein said folding benches comprises inflatable cushions.

6. The vehicle according to claim 1 wherein said at least one side wall skin panel has at least one fenestration.

7. The vehicle according to claim 1 further comprising a hinge disposed between said deck extension and said at least one side wall skin panel, said hinge being disposed at a distance from a top of said at least one side wall panel, such that when said deck extension is deployed, said side wall panel extends upward beyond said deck extension forming a parapet.

8. The vehicle according to claim 7 wherein said at least one sidewall panel at least partially supports said deck extension in a deployed position.

* * * * *